(12) United States Patent
Planells et al.

(10) Patent No.: US 11,292,960 B2
(45) Date of Patent: Apr. 5, 2022

(54) RELEASE SYSTEM AND METHOD

(71) Applicant: Johnson Matthey Public Limited Company, London (GB)

(72) Inventors: Miquel Planells, Billingham (GB); Chun-tian Zhao, Billingham (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 16/643,905

(22) PCT Filed: Sep. 14, 2018

(86) PCT No.: PCT/GB2018/052614
§ 371 (c)(1),
(2) Date: Mar. 3, 2020

(87) PCT Pub. No.: WO2019/058099
PCT Pub. Date: Mar. 28, 2019

(65) Prior Publication Data
US 2020/0255721 A1    Aug. 13, 2020

(30) Foreign Application Priority Data

Sep. 19, 2017  (GB) .................................... 1715109

(51) Int. Cl.
*E21B 47/11*     (2012.01)
*C09K 8/74*      (2006.01)
*C09K 8/035*     (2006.01)
*C09K 8/70*      (2006.01)

(52) U.S. Cl.
CPC ............... *C09K 8/74* (2013.01); *C09K 8/035* (2013.01); *C09K 8/70* (2013.01); *E21B 47/11* (2020.05)

(58) Field of Classification Search
None
See application file for complete search history.

(56) References Cited

U.S. PATENT DOCUMENTS

| 6,564,866 B2 * | 5/2003 | Clark .................... E21B 47/11 |
| | | 166/250.12 |
| 2006/0034927 A1 | 2/2006 | Casadevall et al. |
| 2009/0025470 A1 * | 1/2009 | Green ................... E21B 43/117 |
| | | 73/152.18 |

(Continued)

FOREIGN PATENT DOCUMENTS

| WO | 2006128471 A2 | 12/2006 |
| WO | 2007089934 A2 | 8/2007 |

(Continued)

OTHER PUBLICATIONS

International Search Report of the International Searching Authority for PCT/GB2018/052614 dated Nov. 2, 2018.

*Primary Examiner* — Charles R Nold
(74) *Attorney, Agent, or Firm* — BakerHostetler

(57) ABSTRACT

A release system for releasing a released material into a release fluid is disclosed. The release system comprises a matrix. The matrix comprises at least one first matrix material and at least one second matrix material. The second matrix material is configured to at least partially erode when exposed to the release fluid. The releasable material is held in the matrix such that the at least partial erosion of the second matrix material causes the releasable material to be at least partially released from the matrix.

32 Claims, 2 Drawing Sheets

(56) References Cited

U.S. PATENT DOCUMENTS

| | | | |
|---|---|---|---|
| 2010/0307744 A1 | 12/2010 | Cochet et al. | |
| 2012/0175109 A1* | 7/2012 | Richard | E21B 47/11 166/250.12 |
| 2013/0091943 A1* | 4/2013 | Skillingstad | E21B 47/12 73/152.54 |
| 2016/0032175 A1* | 2/2016 | Norman | C09K 8/03 166/303 |
| 2016/0298412 A1* | 10/2016 | Fripp | C09K 8/426 |
| 2016/0319659 A1* | 11/2016 | Molenaar | E21B 43/26 |
| 2017/0183955 A1* | 6/2017 | Peacock | E21B 47/07 |
| 2017/0349821 A1 | 12/2017 | Wei et al. | |
| 2018/0298274 A1 | 10/2018 | Zhao | |

FOREIGN PATENT DOCUMENTS

| | | |
|---|---|---|
| WO | 2010/140033 A2 | 12/2010 |
| WO | 2016/089388 A1 | 6/2016 |
| WO | 2016/174414 A1 | 11/2016 |
| WO | 2016174415 A1 | 11/2016 |

* cited by examiner

RELEASE SYSTEM AND METHOD

FIELD OF INVENTION

The present invention concerns a release system for releasing a releasable material into a release fluid and a method for monitoring fluids emerging from a fluid system. In particular, but not exclusively, the present invention concerns a release system for releasing a tracer material into a subsurface reservoir and a method for monitoring fluids emerging from a subsurface reservoir.

BACKGROUND

It is well known in the art to use release systems for release of materials into a fluid system. The released materials can, for example, supply nutrition to the system, modulate the system or provide tracing or monitoring to the system. In nature, release of specific biological agents, such as dopamine, serotonin, oxytocin, and so on is controlled by organisms. In oilfield applications, it is well known to release tracer materials to oil, water or gas fluid flows. For example, WO2016174415 describes such release. In medical applications, the control of release of bio-active compounds is of clear interest.

However, the prior art release systems may suffer from a number of shortcomings or failures, which are limiting to their use. In particular, prior art systems are typically designed for the release of small molecular weight compounds, which are released to the release fluid as individual molecules. Such prior art release systems may therefore have difficulty in releasing releasable materials in the form of distinct particles. The release of particles in a controlled way may be desirable as particles can have different features, functions or effects to small molecular weight compounds and the release of such particles may therefore allow processes that are not possible with small molecular weight compounds. However, releasing such distinct particles in a controllable way is challenging and the use of controlled release particles may therefore at present be hampered by the lack of suitable release systems.

Aspects of the present invention seek to ameliorate some or all of the above problems and to provide an improved release system. Particularly, but not exclusively, aspects of the invention seek to provide an improved release system for the release of particles into a fluid system.

SUMMARY OF THE INVENTION

According to a first aspect of the invention there is provided a release system for releasing a releasable material into a release fluid, the release system comprising a matrix, wherein the matrix comprises at least one first matrix material and at least one second matrix material, the second matrix material being configured to at least partially erode when exposed to the release fluid, wherein the releasable material is held in the matrix such that the at least partial erosion of the second matrix material causes the releasable material to be at least partially released from the matrix.

By providing a matrix comprising multiple matrix materials, the release system is made more controllable and can provide faster or slower release depending on the materials chosen for the first and second matrix materials along with the composition, formulation or structure of the matrix. For example, the second matrix material may be selected so as to erode at a particular rate in order to control the release of the releasable material. The erosion of the second matrix material may occur for example by dissolution of the second matrix material in the release fluid, by degradation of the second matrix material in the release fluid, by disintegration of the second matrix material in the release fluid or by a combination of one or more of those processes.

Advantageously the materials can be chosen to selectively release into a pre-determined type of fluid. For example, where the system is used in a subsurface hydrocarbon reservoir, the materials may be chosen to selectively release into hydrocarbon fluids or to selectively release into aqueous fluids. For example, the second matrix material may be soluble in hydrocarbon fluids produced in the reservoir and the releasable material, which may for example be a reservoir treatment material or a tracer material, would therefore be released in the event of hydrocarbon flow. As another example, the second matrix material may be water-soluble and the releasable material, which again may be a reservoir treatment material or a tracer material for example, would therefore be released in the event of water flow. Even more advantageously this system allows discrete particles to be released by the erosion of the second matrix material. These particles may be comprised partially or entirely of solid materials that do not dissolve in the release fluid but instead are released as a suspension of particles.

By providing multiple matrix materials the first matrix material can continue to provide mechanical strength and structure to the release system even when the second matrix material is partially or entirely eroded. This is beneficial over single matrix systems where the material ceases to provide structural integrity, and continuing control over release, or physical properties as it is eroded. It will be understood therefore that the first material remains in place when the second material is eroded by the release fluid. In other words, the first matrix is configured to be stable at least during the release of the releasable materials. For example, the first material is preferably insoluble or negligibly soluble in the release fluid so that the first material remains in place when the second material is eroded.

The release rate of the releasable material into the release fluid is preferably dependent on the erosion rate of the second matrix material, which can be controlled by not only the properties of the second matrix material, but also by the composition and structure of the matrix. In simple terms, the degree of containment of the second matrix material in the system, by the first matrix material, may be an important factor, as the containment of the second matrix material will control the access of release fluid to the second matrix material. The more contained the second matrix material is by the first matrix material, the more slowly the second matrix material is eroded and the releasable material released. Changes in the composition and structure of the matrix will vary the degree of containment of the second matrix material by the first matrix material within the system. The selection of the first matrix material will affect the structure in the first instance. Next the fraction of the first matrix material in the system will affect the structure. The higher the fraction of the first matrix material, the more likely the second matrix material is better covered and contained by the first matrix material. Further the degree of containment can be varied by the manufacturing technology employed to produce the matrix. The skilled person can select the manufacturing technology to provide adjustment and control to the release rate of the releasable material.

In some embodiments, the second matrix material may swell when exposed to the release fluid and the swelling of the second matrix material may cause the releasable material to be at least partially released from the matrix.

Preferably the releasable material is a solid. Preferably the releasable material is in the form of particles, most preferably discrete particles. It is a particular advantage of the system that it allows solid matter such as particles to be released into a flowing stream of release fluid in a controlled way.

Preferably the releasable material consists of particles with a D50 less than 500 microns and more preferably less than 100 microns. The D50 may be measured according to the ASTM E 799 method and describes an averaging of the particle sizes.

Preferably the first matrix material comprises a material that is not erodible by the release fluid. For example, the first matrix material preferably comprises a thermoset polymer, preferably wherein the thermoset polymer comprises at least one monomer and optionally further comprises additives or hardening agents. In some aspects of the invention, the first matrix material preferably comprises a thermoplastic polymer having a processing temperature higher than the working temperature of the release system. In some embodiments to first matrix material is a mixture of a thermoset polymer and a thermoplastic polymer, preferably a thermoplastic polymer having a processing temperature higher than the working temperature of the release system. In some aspects of the invention the first matrix material is an inorganic material.

Preferably the first matrix material is a material not erodible in the release fluid, as described above, and the second matrix material is soluble in the release fluid. In that way, the first matrix material provides continuing structural integrity to the release system, while the soluble second matrix material controls in a controlled way the release of the releasable material into the releasing fluid.

Preferably the release fluid may be aqueous. Preferably the release fluid may be non-aqueous.

Preferably the release fluid is refined or unrefined mineral oil fluids.

In a particularly preferable embodiment the release system is for use in a subsurface hydrocarbon reservoir, which may be a geothermal reservoir but is preferably an onshore or offshore hydrocarbon reservoir, and the release fluid is selected from the group consisting of: produced water, produced hydrocarbon, injection water or hydraulic fracturing fluid. Most preferably the release fluid is produced water or produced hydrocarbon. The releasable material may be an oil field chemical such as a tracer, a scale inhibitor, a biocide, a hydrate and halite inhibitor, a corrosion inhibitor, a wax and asphaltene control substance, a demulsifier, a gel breaker, a drag reducer, a salt inhibitor, a gas hydrate inhibitor, an oxygen scavenger, a foaming agent, a surfactant or a well clean up substance. Preferably the released material is a tracer. Tracing of flows from subsurface hydrocarbon reservoirs may give important insights into the performance of the reservoir, for example by providing information on the production of materials from different zones of the reservoir. In order to provide improved data in shorter timescales there is a need for new and improved tracers. Many currently used tracers are chemical compounds, which are selected to be soluble in the reservoir fluid of interest. However, the ability to use tracers in the form of particles may allow significant improvements in the detectability of the tracers and open up the possibility of new detection techniques that can provide results more quickly including, for example real-time online detection systems. It may be important that tracer release systems inserted into a well completion can remain active for a substantial period of time, such as at least 6 months, preferably at least a year and more preferably at least 2 years so as to provide data over a sustained period. In order to achieve that it is important that the tracer is released from the system in a controlled and steady manner. It is also advantageous if the release rate can be even over time. The release system of the present invention can provide such advantages as the first matrix material maintains the structural integrity of the release system while the controlled erosion of the second matrix material maintains the release rate of the releasable material over time.

Preferably the first matrix material is one or more of: epoxy resin, polyester, polyurethane, POM, formaldehyde resin or polyamide. For example the first matrix material may be one or more of Nylon 6, Nylon 6,6,polyimide, syndiotactic polystyrene, polyketone, polysulfone, polysiloxanes or cured melamine-formaldehyde resin. In that way the first matrix material is a well-known, trusted material that is familiar to customers and whose performance data is well-established.

The second matrix material may be a polymer, preferably a low molecular weight polymer, or a low molecular weight organic or inorganic compound, or mixtures thereof.

Preferably the second matrix material is an oil erodible material. For example, the second matrix material is preferably chosen from one or more of: poly vinyl acetate, polybutylene, poly acrylate (such as polymethyl acrylate, polyethyl acrylate and polybutylacrylate), atactic polypropylene, polystyrene, un-crosslinked/un-sulphured rubber (such as polybutadiene, polyisoprene, polychloroprene and polysiloxanes), polyester, polyvinyl chloride, beeswax, carnauba wax, organic waxes, silicone wax, solid vegetable fats and fatty acid esters. In that way, the material is cheap, available in large quantity, and may be compatible for release into hydrocarbon-based release fluids.

Preferably the second matrix material is a water erodible material. For example, the second matrix material is preferably chosen from one or more of: poly vinyl alcohol, poly ethylene glycol, polypropylene glycol, polyacrylic acid, polymethylacrylic acid, polyacrylic acid sodium salt, polymethylacrylic acid sodium salt, polyacrylamide, polyamine (such as polyethyleneimine), a polysaccharide (such as starch and cellulose), a derivative of cellulose or starch (such as methyl cellulose, carboxymethylcellulose and hydroxypropylcellulose), chitosan and metal salts (such as magnesium chloride, sodium carbonate, sodium oxalate, sodium oleate, sodium palmitate or sodium stearate). In that way, the material is cheap, available in large quantity, and may be compatible for release into aqueous release fluids.

Preferably the releasable material is encapsulated within one or more encapsulating materials, wherein the encapsulating materials are not the same as the released material or any material of the matrix. In that way either the entire capsule may be released or the capsule may contain the releasable material. In the former case, the capsule provides a mechanism of transport of a discrete quantity of material with the flow of the releasing fluid. For example, the capsule material may improve the dispersibility of the material in the release fluid and reduce any tendency for the material to settle out and not follow the flow of the release fluid. In the latter case, the capsule may provide an additional layer of control over the release of the releasable material to the release fluids. This is advantageous in that release properties can be controlled in the creation of the capsule, for example by controlling the capsule material composition. That may allow all further formulations to be made more similar, regardless of variabilities in the releasable material contained within the capsule, reducing on manufacturing time and waste.

Preferably the releasable material is not covalently or ionically bonded to any part of the matrix. Covalent and ionic bonds are strong chemical bonds and a releasable material that is covalently or ionically bonded to the matrix may therefore not provide a steady release rate profile over time.

Preferably the releasable material comprises solid, insoluble particles. For example, the particles may comprise radioactive isotopes, phosphors, RFID tags, microelectromechanical systems (MEMS) devices, quantum dots, encapsulated chemical tracers or well treatment agents, or photonic crystals.

Preferably the releasable material comprises an upconverting phosphor and more preferably an encapsulated upconverting phosphor. It will be appreciated that the release system may be particularly useful for releasing solid particles such as phosphors into release fluids in a controlled way. Upconverting phosphors may be particularly advantageous for use as tracers in hydrocarbon wells since the emissions from the upconverting phosphors can be separated from the fluorescence of the oil. In a particularly preferable embodiment, the releasable material is an encapsulated upconverting phosphor, which is used as a tracer to trace a hydrocarbon or water flow from a hydrocarbon well. The tracer is preferably detected online using an optical detector that detects the emissions from the upconversion whilst screening out the fluorescence of the oil.

Preferably the release fluid is fluid in a subsurface reservoir and the releasable material is a tracer material. Controlling release in a subsurface reservoir can be challenging because the release system must be deployed deep underground in an inaccessible location and must then release the tracer material in a controlled manner over time without further interaction with operators. By providing a release system of the invention, the gradual erosion of the second matrix material controls the release rate over time, while the enduring presence of the first matrix material permits the release system to retain its structure and to remain in position so that the tracer material is released into the correct part of the reservoir. That may be particularly important in tracing applications, where it is important to know precisely where the tracer material was released in order to interpret the data on tracer concentration recorded in the produced fluids from the well. It may also however be desirable in other applications, for example where it is important that a well-treatment-chemical is delivered at a steady rate to a particular part of the reservoir over a period of time. Thus, it may be that the release fluid is fluid in a subsurface reservoir and the releasable material is an oil field chemical. The system may be particularly advantageous in hydrocarbon wells, which may be subject to high pressures or temperatures.

According to a second aspect of the invention there is provided a method for releasing a releasable material into a fluid system, the method comprising: introducing a release system into the fluid system; and releasing one or more releasable materials from the release system into fluids in the fluid system; wherein the release system is a release system according to the first aspect of the invention.

In that way, the method is an improvement over current techniques in that it allows for the release of a greater range of materials in varying release fluids. It is further advantageous because it allows the release of materials that are comprised of solid particles. For example, an RFID tag may be released by this system over time, or a particle of catalyst, providing an ongoing supply of new catalyst to the fluid system. As another example, the released material may be an encapsulated oil field chemical, such as a well treatment agent, such as a tracer, a scale inhibitor, a biocide, a hydrate and halite inhibitor, a corrosion inhibitor, a wax and asphaltene control substance, a demulsifier, a gel breaker, a drag reducer, a salt inhibitor, a gas hydrate inhibitor, an oxygen scavenger, a foaming agent, a surfactant or a well clean up substance. The provision of even release of such treatment agents over time, may be particularly advantageous in providing long-lived effects in oil reservoirs. The ability to release particles over time may for example permit the release of particulate tracers, which may allow significant improvements in the detectability of the tracers over chemical tracers of the prior art. For example, the particles may comprise upconverting phosphors suitable for optical detection in low concentrations. The invention may thus open up the possibility of new detection techniques that can provide results more quickly including, for example real-time online detection systems.

Preferably the method is a method for monitoring fluids emerging from a fluid system, the method comprising: introducing a release system into the fluid system; releasing one or more releasable materials from the release system into fluids in the fluid system; allowing the fluids to be produced from the fluid system; and measuring the amount of the releasable materials present in the fluids, wherein the release system is a release system according to the first aspect of the invention. Thus, the releasable materials are preferably tracer materials.

In that way, the method is an improvement over current techniques in that it allows for the release of a greater range of tracer materials in varying release fluids. That is advantageous because there are often insufficient numbers of tracer materials available to be used and the present invention may allow tracer materials to be deployed that previously could not be deployed. It is further advantageous because it allows the fluid system under study to be monitored with tracer materials that are comprised of solid particles. This is particularly advantageous because it allows tracer materials with properties hitherto not available to be used as tracer materials in these systems. For example, an RFID tag may be used as the tracer. The ability to release particles over time may for example permit the release of particulate tracers, which may allow significant improvements in the detectability of the tracers over chemical tracers of the prior art. For example, the particles may comprise upconverting phosphors suitable for optical detection in low concentrations. The invention may thus open up the possibility of new detection techniques that can provide results more quickly including, for example real-time online detection systems. Thus, the method preferably comprises measuring the amount of the releasable materials present in the fluids online and in real-time. For example, the method preferably comprises measuring the amount of the releasable materials present in the fluids by optically detecting the releasable material in the fluids as they flow from the well. It will be appreciated that the detection may involve the diversion of a part of the fluids to a detector, but that the detection occurs substantially in real-time and as opposed to prior art methods of taking of samples that are then processed in a laboratory at a later time. The detector may, for example comprise a spectrometer and filters to illuminate the fluids with an excitation light and measure the upconversion emission in response to that excitation light.

Preferably the mechanism of release is the dissolution of the second matrix material in the release fluid, allowing the releasable material to become suspended in the release fluids.

Preferably the releasable material is released at a release rate profile, for example an even release rate. Even release rates may be advantageous, for example in providing uniform treatments, such as scale inhibition, over time or for providing predictable amounts of tracer for monitoring a flow.

It will be appreciated that features described in relation to one aspect of the invention may be equally applicable to other aspects of the invention. For example, features described in relation to a release system may be equally applicable to a method for release or for monitoring fluids and vice versa. It will also be appreciated that optional features may not apply to, and may be excluded from, certain aspects of the invention.

DESCRIPTION OF THE DRAWINGS

The invention will be further described by way of example only with reference to the following figures, of which.

DETAILED DESCRIPTION

Figure 1:
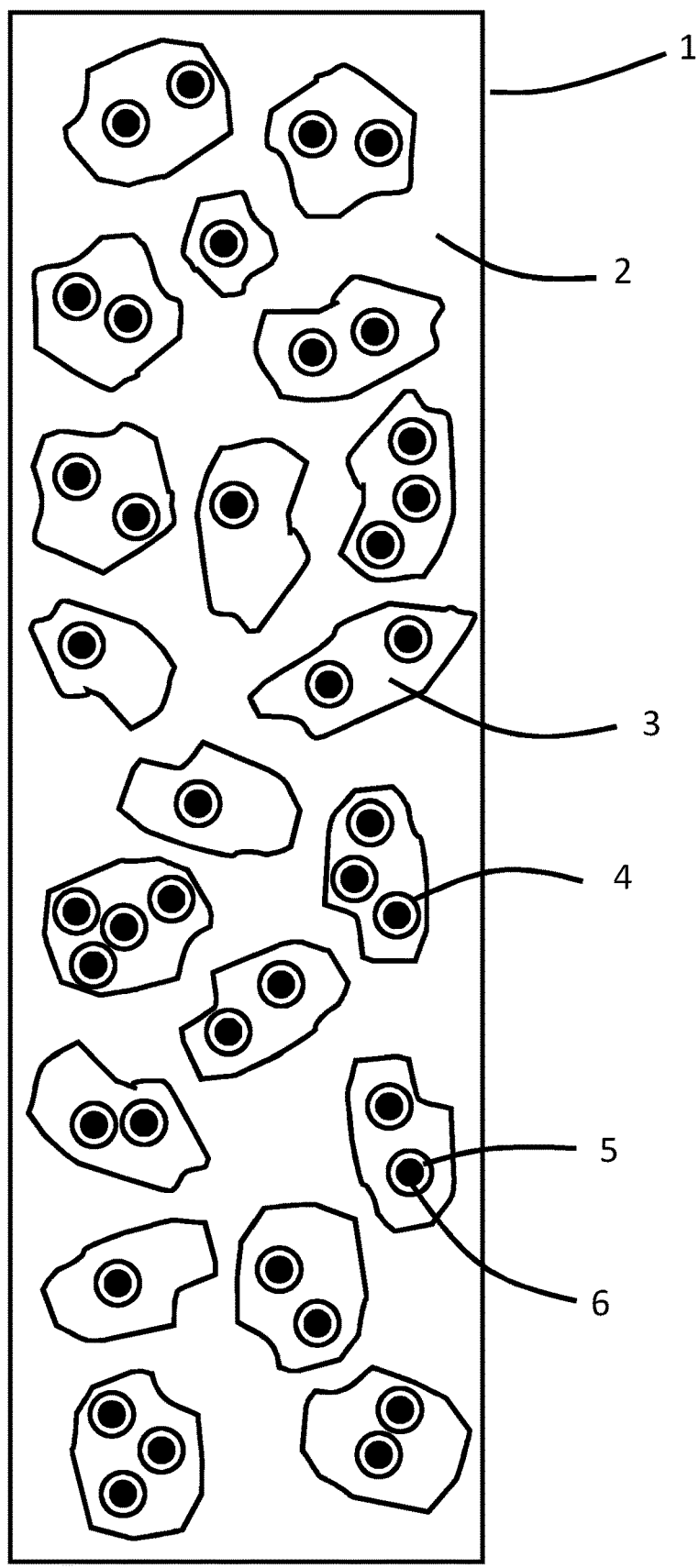
FIG. 1 is a view of a release system according to an embodiment of the invention.

In FIG. 1, a release system 1 comprises a matrix comprising a first matrix material 2 and a second matrix material 3. A releasable material 4 is held in the second matrix material 3. In this embodiment, the releasable material 4 is a particulate material comprising a particle 6 encapsulated in an encapsulating material 5.

For example, the particle 6 may be an upconverting phosphor and the encapsulating material 5 may be a polymer coating that improves the dispersibility of the upconverting phosphor in a fluid.

Figure 2:
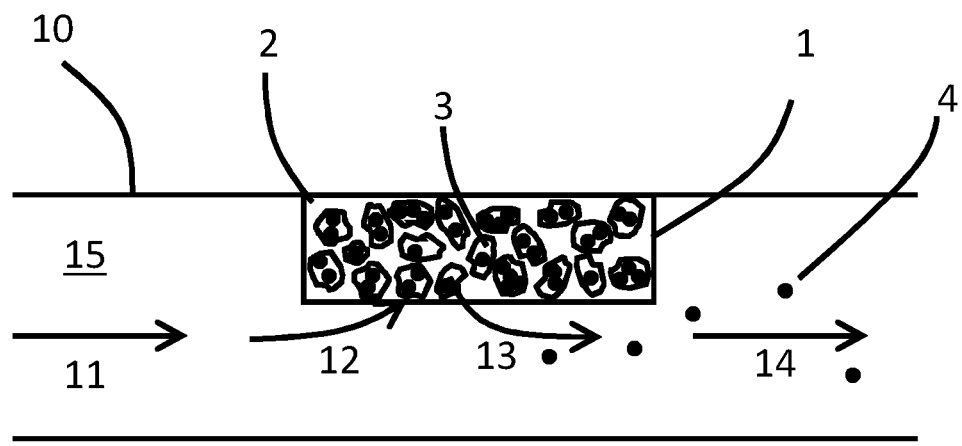
FIG. 2 is a view of the release system of FIG. 1 releasing releasable material into a fluid system according to an embodiment of the invention.

In FIG. 2, the release system 1 is releasing the releasable material 4 into a flow 11, 12, 13, 14 of a release fluid 15 along a conduit 10. The release fluid 15 flows 12 into the release system 1 and erodes the second matrix material 3, for example by degradation or dissolution, thus releasing the releasable material 4 into the flow 13 of the release fluid 15 away from the release system. The releasable material 4 is then carried downstream in the flow 14 of the release fluid 15. The first matrix material 2 is not degraded by the release fluid 15 and thus remains in place and maintains the structure of the release system 1. For example, the conduit 10 may be part of a reactor system and the releasable material 4 may be catalyst being added gradually to the reactor system over time. As another example, the conduit 10 may be a pipe and the releasable material 4 may be a scale or corrosion inhibitor being released gradually into the pipe over time to prevent the formation of scale or corrosion. As a further example, the conduit 10 may be a process pipe or the bore of a hydrocarbon well and the releasable material 4 may be a tracer material used to identify flow 14 from the location of the release system 1 in the conduit 10 at another location downstream of the release system 1.

Figure 3:
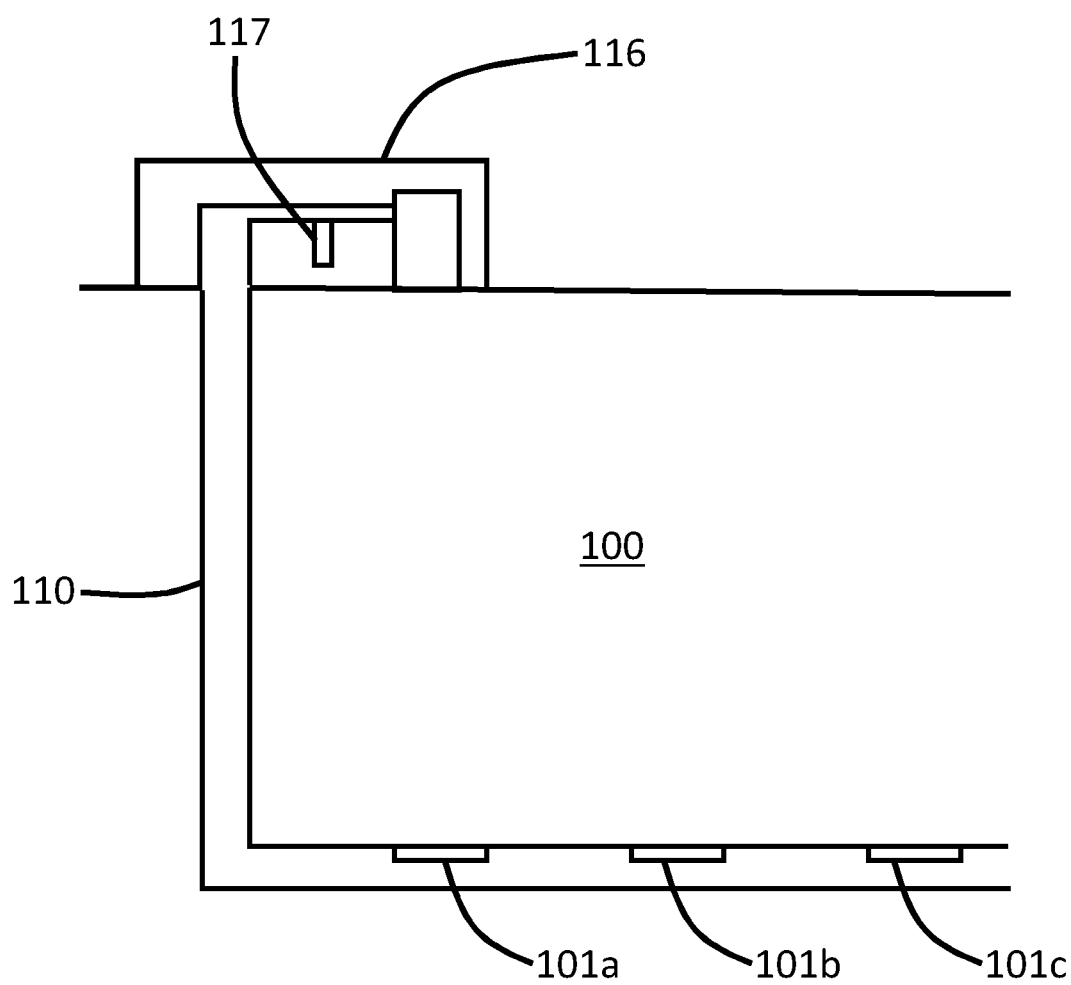
FIG. 3 is a view of a method of monitoring a hydrocarbon well according to an embodiment of the invention.

In FIG. 3, release systems 101a, 101b and 101c are positioned in a well 110 extending into a hydrocarbon formation 100. The release systems 101a, 101b and 101c are similar to release system 1 described above and contain tracers as the releasable materials. A different tracer is contained in each of the release systems 101a, 101b and 101c. At the topsides facility 116 a detector 117 is located to detect the presence of the different tracers in the fluids flowing from the well 110. By detecting the different tracers originating from release systems 101a, 101b and 101c, the detector 117 can be used to determine what proportion of the flow is coming from which region of the well 110. The tracer materials may, for example, be upconverting phosphors and the detector 117 an optical detector that excites the phosphors and measures their emissions. Such phosphors may be particularly suitable for detection as the upconversion emission is away from any natural fluorescence of the oil and may thus be suitable for online detection by an optical detector in a way that chemical tracers may not be. Because the release systems 101a, 101b and 101c can release particles in a controlled manner, the use of particle tracers, such as upconverting phosphors, which may be more readily detectable using online detectors such as detector 117 is made possible.

It will be appreciated that the embodiments set out above are examples of the invention and that the skilled person would appreciate that variations were possible within the scope of the invention. For example, a radioactive tracer particle could be released in a controlled manner into a process stream and detected downstream using a radiation detector.

The invention claimed is:

1. A release system for releasing a releasable material into a release fluid, the release system comprising a matrix, wherein the matrix comprises at least one first matrix material and at least one second matrix material, the second matrix material being configured to at least partially erode when exposed to the release fluid, wherein the releasable material is held in the matrix such that the at least partial erosion of the second matrix material causes the releasable material to be at least partially released from the matrix, wherein the releasable material is a subsurface reservoir tracer in the form of solid particles of tracer material with a D50 less than 500 microns, the solid particles of tracer material being insoluble in the subsurface reservoir release fluid, and wherein the first matrix material is configured to remain in place during erosion of the second matrix material and release of the solid particles of tracer material as a suspension of particles within the subsurface reservoir release fluid, the first matrix material comprising a first polymer material selected from a thermoset polymer and a thermoplastic polymer having a processing temperature higher than a working temperature of the release system, and the second matrix material comprising a second polymer selected from an oil erodible polymer material and a water erodible polymer material.

2. A release system according to claim 1, wherein the releasable material consists of particles with a D50 less than 100 microns.

3. A release system according to claim 1, wherein the first matrix material comprises a thermoset polymer and the second matrix material is a soluble material, wherein the thermoset polymer comprises at least one monomer and optionally further comprises additives or hardening agents.

4. A release system according to claim 1, wherein the first matrix material comprises a thermoplastic polymer and the second matrix material is a soluble material, wherein the thermoplastic polymer has a processing temperature higher than a working temperature of the release system.

5. A release system according to claim 1 wherein the release fluid is aqueous.

6. A release system according to claim 1 wherein the release fluid is non-aqueous.

7. A release system according to claim 1 wherein the release fluid is refined or unrefined mineral oil fluids.

8. A release system according to claim 1, where the first matrix material comprises one or more of: epoxy resin, polyester, polyurethane, POM, formaldehyde resin.

9. A release system according to claim 1, wherein one or more of the second matrix materials is selected from the group consisting of: poly vinyl acetate, polybutylene, poly acrylate, atactic polypropylene, polystyrene, un-crosslinked/un-sulphured rubber, polyester, polyvinyl chloride, beeswax, carnauba wax, organic waxes, silicone wax, solid vegetable fats and fatty acid esters.

10. A release system according to claim 1, wherein one or more of the second matrix materials is selected from the group consisting of: poly vinyl alcohol, poly ethylene glycol, polypropylene glycol, polyacrylic acid, polymethylacrylic acid, polyacrylic acid sodium salt, polymethylacrylic acid sodium salt, polyacrylamide, polyamine, a polysaccharide, a derivative of cellulose or starch, chitosan and metal salts.

11. A release system according to claim 1 wherein the releasable material is encapsulated within one or more encapsulating materials, wherein the encapsulating materials are not the same as the releasable material or any of the first or second matrix materials.

12. A release system according to claim 11, wherein the releasable material is released from the matrix while encapsulated in the encapsulating material.

13. A release system according to claim 1 wherein the releasable material is not covalently or ionically bonded to any part of the matrix.

14. A release system according to claim 1, wherein the releasable material comprises an encapsulated upconverting phosphor.

15. A method for releasing a solid tracer material into a subsurface reservoir fluid system, the method comprising: introducing a release system into the subsurface reservoir fluid system; and releasing one or more releasable materials from the release system into fluids in the subsurface reservoir fluid system; wherein the release system is a release system according to claim 1.

16. A method according to claim 15 wherein the mechanism of release is the dissolution of one or more second matrix materials in the fluids, allowing the releasable material to become suspended in the fluids.

17. A method for monitoring fluids emerging from a subsurface reservoir fluid system, the method comprising: introducing a release system into the subsurface reservoir fluid system; releasing one or more releasable materials at a release rate profile from the release system into fluids in the subsurface reservoir fluid system; allowing the fluids to be produced from the subsurface reservoir fluid system; and measuring the amount of the releasable materials present in the fluids, wherein the release system is a release system comprising a matrix, wherein the matrix comprises at least one first matrix material and at least one second matrix material, the second matrix material being configured to at least partially erode when exposed to the release fluid, wherein the one or more releasable materials are held in the matrix such that the at least partial erosion of the second matrix material causes the one or more releasable materials to be at least partially released from the matrix, wherein the one or more releasable materials are subsurface reservoir tracers in the form of solid particles of tracer material with a D50 less than 500 microns, the solid particles of tracer material being insoluble in the subsurface reservoir release fluid, and wherein the first matrix material is configured to remain in place during erosion of the second matrix material and release of the solid particles of tracer material as a suspension of particles within the subsurface reservoir release fluid, the first matrix material comprising a first polymer material selected from a thermoset polymer and a thermoplastic polymer having a processing temperature higher than a working temperature of the release system, and the second matrix material comprising a second polymer selected from an oil erodible polymer material and a water erodible polymer material.

18. A method according to claim 17, wherein the method comprises measuring the amount of the releasable materials present in the fluids online and in real-time.

19. A method according to claim 18, wherein the method comprises measuring the amount of the releasable materials present in the fluids using an optical detector.

20. A method according to claim 17, wherein the releasable material consists of particles with a D50 less than 100 microns.

21. A method according to claim 17, wherein the first matrix material comprises a thermoset polymer and the second matrix material is a soluble material, wherein the thermoset polymer comprises at least one monomer and optionally further comprises additives or hardening agents.

22. A method according to claim 17, wherein the first matrix material comprises a thermoplastic polymer and the second matrix material is a soluble material, wherein the thermoplastic polymer has a processing temperature higher than a working temperature of the release system.

23. A method according to claim 17, wherein the release fluid is aqueous.

24. A method according to claim 17, wherein the release fluid is non-aqueous.

25. A method according to claim 17, wherein the release fluid is refined or unrefined mineral oil fluids.

26. A method according to claim 17, where the first matrix material comprises one or more of: epoxy resin, polyester, polyurethane, POM, formaldehyde resin.

27. A method according to claim 17, wherein one or more of the second matrix materials is selected from the group consisting of: poly vinyl acetate, polybutylene, poly acrylate, atactic polypropylene, polystyrene, un-crosslinked/un-sulphured rubber, polyester, polyvinyl chloride, beeswax, carnauba wax, organic waxes, silicone wax, solid vegetable fats and fatty acid esters.

28. A method according to claim 17, wherein one or more of the second matrix materials is selected from the group consisting of: poly vinyl alcohol, poly ethylene glycol, polypropylene glycol, polyacrylic acid, polymethylacrylic acid, polyacrylic acid sodium salt, polymethylacrylic acid sodium salt, polyacrylamide, polyamine, a polysaccharide, a derivative of cellulose or starch, chitosan and metal salts.

29. A method according to claim 17, wherein the releasable material is encapsulated within one or more encapsulating materials, wherein the encapsulating materials are not the same as the releasable material or any of the first or second matrix materials.

30. A method according to claim 29, wherein the releasable material is released from the matrix while encapsulated in the encapsulating material.

31. A method according to claim 17, wherein the releasable material is not covalently or ionically bonded to any part of the matrix.

32. A method according to claim 17, wherein the releasable material comprises an encapsulated upconverting phosphor.

\* \* \* \* \*